United States Patent [19]

Totani et al.

[11] Patent Number: 5,359,117
[45] Date of Patent: Oct. 25, 1994

[54] PROCESSES FOR PRODUCING AROMATIC POLYCARBONATE OLIGOMER AND AROMATIC POLYCARBONATE

[75] Inventors: Yoshiyuki Totani; Motokazu Hirao; Tomonori Ito; Masakatsu Nakatsuka, all of Yokohama; Akihiro Yamaguchi, Kamakura; Ken-Ichi Goto, Ohmuta; Takashi Kuroki, Ohmuta; Yukiko Mori, Ohmuta; Shoji Obuchi, Ohmuta; Masahiro Ohta, Ohmuta, all of Japan

[73] Assignee: Mitsui Toatsu Chemicals, Inc., Tokyo, Japan

[21] Appl. No.: 87,340

[22] Filed: Jul. 8, 1993

[30] Foreign Application Priority Data

Jul. 27, 1992 [JP] Japan ................. 4-199553
Dec. 18, 1992 [JP] Japan ................. 4-338582

[51] Int. Cl.$^5$ ............................................. C07C 69/96
[52] U.S. Cl. ......................................... 558/268
[58] Field of Search ............................ 558/268

[56] References Cited

U.S. PATENT DOCUMENTS

| | | | |
|---|---|---|---|
| 3,646,102 | 2/1972 | Kobayashi et al. | 558/268 |
| 3,787,359 | 1/1974 | Horn et al. | 526/68 |
| 4,038,252 | 7/1977 | Vernalekan et al. | 528/198 |
| 4,089,888 | 5/1978 | Tokumitsu et al. | 558/268 |
| 4,122,112 | 10/1978 | Koda et al. | 558/268 |

FOREIGN PATENT DOCUMENTS

| | | |
|---|---|---|
| 46-21460 | 6/1971 | Japan . |
| 47-14297 | 8/1972 | Japan . |
| 50-122595 | 9/1975 | Japan . |
| 56-44091 | 10/1981 | Japan . |
| 923192 | 4/1963 | United Kingdom . |

OTHER PUBLICATIONS

Journal of Polymer Science, vol. 55, pp. 251-258, (1961).

Primary Examiner—Patricia L. Morris
Assistant Examiner—Michael G. Ambrose
Attorney, Agent, or Firm—Burns, Doane, Swecker & Mathis

[57] ABSTRACT

A process for producing continuously an aromatic polycarbonate oligomer by reacting an aromatic dihydroxy compound and an alkali metal base or an alkaline earth metal base with a carbonyl halide compound comprises:

(1) feeding continuously to a tank reactor an aromatic dihydroxy compound, water, a molecular weight controlling agent, a polymerization catalyst, a carbonyl halide compound, and an organic solvent, and an alkali metal base or an alkaline earth metal base in an amount of 1.15–1.6 equivalents based on the aromatic dihydroxy compound, (2) carrying out the reaction with a residence time as defined by the following formula, $$\log Y < -2.19X + 1.84 \ (0.0005 \leq X < 0.84, 1 \leq Y < 69)$$

where X is an amount of the polymerization catalyst in terms of mole % based on the amount of mole of the aromatic dihydroxy compound fed per unit time, and Y is a residence time (min.), and (3) continuously withdrawing the reaction mixture from the tank reactor to obtain an aromatic polycarbonate oligomer having a number average molecular weight of 1,000–10,000. An aromatic polycarbonate is produced by polycondensation of the aromatic polycarbonate oligomer.

17 Claims, No Drawings

PROCESSES FOR PRODUCING AROMATIC POLYCARBONATE OLIGOMER AND AROMATIC POLYCARBONATE

BACKGROUND OF THE INVENTION

1. Field of the Invention

The present invention relates to processes for producing an aromatic polycarbonate oligomer and an aromatic polycarbonate.

2. Description of the Related Art

Heretofore, there have been known methods for producing continuously an aromatic polycarbonate oligomer or an aromatic polycarbonate by reacting an aqueous alkali metal base or alkaline earth metal base solution of an aromatic dihydroxy compound with a carbonyl halide compound.

For example, as a continuous method for producing an aromatic polycarbonate oligomer, there are known methods disclosed in Japanese Patent Publication Nos. Sho 46-21460 (U.S. Pat. No. 3,646,102) and Sho 56-44091 (U.S. Pat. No. 4,089,888). These methods do not use any polymerization catalyst and molecular weight controlling agent.

These methods use a tubular reactor, and are useful when such type of reactor is available. However, it is often preferable to use a more conventional apparatus for various purposes such as a tank reactor with a stirrer and the like.

In addition, when a tubular reactor is used, an organic solvent is vaporized in the tube at a high reaction temperature and cavitation, clogging and the like occur, and therefore, stricter cooling is often required than in the case of a tank reactor.

Further, in the above-mentioned methods for producing an aromatic polycarbonate oligomer, the haloformation reaction (production of an aromatic polycarbonate oligomer) is carried out in the absence of a molecular weight controlling. Therefore, a molecular weight controlling agent is added to the aromatic polycarbonate oligomer thus produced and then a polycondensation reaction is effected to produce an aromatic polycarbonate. However, this method has the disadvantage in that the rate of end capping of the resulting aromatic polycarbonate is very low.

Aromatic polycarbonates are thermoplastic polymers, and with respect to recycling of plastics to which people have recently paid attention, aromatic polycarbonates are advantageous since the recycling can be easily effected.

However, it is known that in the case of an aromatic polycarbonate having a low rate of end capping, rearrangement of the high polymer chain occurs when melted and the molecular weight and the molecular weight distribution change [Kobunshi Kagaku, 21, 505 (1964); J. Polymer Sci., 55, 251 (1961)].

It is well known to those skilled in the art that molecular weight and molecular weight distribution most closely relate to physical proporties of polymers, and when such phenomena as described above occur, physical properties of the aromatic polycarbonates disadvantageously change or deteriorate when performing melt-shaping during recycling of the aromatic polycarbonates.

Therefore, a method for producing aromatic polycarbonates having a very high rate of end capping and a high polymer chain which is hardly rearranged is strongly desired.

It is known that aromatic polycarbonates can be continuously produced by a haloformation reaction in the presence of a molecular weight controlling agent.

For example, according to the process of British Patent No. 923,192, an aromatic dihydroxy compound, a molecular weight controlling agent, an aqueous solution of sodium hydroxide and phosgene are fed to the first reaction vessel in a series of four or five consecutively linked vessels and reacted. A polymerization catalyst is added to the second or the third reaction vessels where the reaction further proceeds, so as to carry out the polycondensation. As a result, an aromatic polycarbonate is produced.

However, when an aromatic polycarbonate is produced by the haloformation reaction in the presence of a molecular weight controlling agent, the rate of end capping of the resulting aromatic polycarbonate is as low as about 70–80%. In addition, according to the process of British Patent No. 923,192, the amount of hydrolysis of the carbonyl halide compound is not a negligible amount upon producing an aromatic polycarbonate.

On the other hand, it is also known to produce an aromatic polycarbonate in the presence of a polymerization catalyst.

For example, a liquid aqueous phase, a liquid organic phase and a gas phase containing phosgene are fed to a reactor containing packing in the presence of an amine or its salt. The reaction mixture passing through the final reactor is separated into a liquid phase and a gas phase, followed by isolating the reaction product from the liquid phase to obtain a high molecular weight linear polycarbonate [Japanese Patent Application Laid-open No. Sho 47-14297 (U.S. Pat. No. 3,787,359)].

As another example, a polycarbonate is prepared by a phase boundary condensation method comprising phosgenation of an aqueous alkali metal salt solution of one or more aromatic dihydroxy compounds in which process an aromatic chlorinated hydrocarbon is used as the solvent. The synthesis of the polycarbonate is carried out in two stages. In the first stage, the reaction of the alkali metal salt solution of the aromatic dihydroxy compound(s) with phosgene is carried out at an OH concentration of between 0.01 and 0.1% by weight of OH, relative to the aqueous phase, in the presence of 0.1 to 2.5 mole % of trialkylamine, relative to aromatic dihydroxy compound(s), and at a temperature higher than 70° C. with a dwell time of less than 5 minutes. In the second stage, the polycondensation is effected by adjusting the OH concentration to 0.20 to 0.50% by weight of OH, relative to the aqueous phase, optionally with further addition of trialkylamine, at a temperature higher than 80° C. and with a dwell time of more than 1 minute [Japanese Patent Application Laid-open No. Sho 50-122,595 (U.S. Pat. No. 4,038,252)].

According to the method of Japanese Patent Application Laid-open No. Sho 47-14297 (U.S. Pat. No. 3,787,359), there is used a reactor such as a packed column containing packing. Therefore, the stirring and mixing can not be efficiently effected as compared with the production of an aromatic polycarbonate using a tank reactor and the amount of hydrolyzed carbonyl halide compound increases disadvantageously.

According to the method of Japanese Patent Application Laid-open No. Sho 50-122,595 (U.S. Pat No. 4,038,252), the polymerization catalyst and the molecular weight controlling agent are added upon the haloformation reaction. Therefore, the rate of end capping is fairly improved and hydrolysis of the carbonyl halide compound is considerably suppressed.

The present inventors studied the above-mentioned method and found that when the aromatic dihydroxy compound was reacted with the carbonyl halide compound under conditions of low OH concentration in the aqueous phase in the presence of a trialkylamine, a decomposition reaction of the trialkylamine occurred, and the nitrogen content in the resulting aromatic polycarbonate increased. In general, such increased nitrogen content causes coloration of the aromatic polycarbonate upon high temperature shaping so that the aromatic polycarbonate thus shaped does not have a desirable color.

Therefore, there is desired a method for producing an aromatic polycarbonate having a low nitrogen content and a high rate of end capping while suppressing hydrolysis of a carbonyl halide compound.

The above-mentioned British Patent No. 923,192 discloses that polymerization catalyst is desirably added to the first tank reactor or the following tank reactor(s), preferably, to a later tank reactor where the reaction has fairly proceeded, but nothing is mentioned about the amount of the polymerization catalyst and the residence time in the tank reactor.

In the working example for producing an aromatic polycarbonate using a continuous tank reactor apparatus, the residence time in the first tank reactor is 4-5 min and a polymerization catalyst in an amount of 0.89 mole % based on the aromatic dihydroxy compound is added in the second or third tank reactor.

However, when the present inventors studied the example by adding the same amount of the polymerization catalyst to the first tank reactor, it was difficult to control the molecular weight and therefore, the resulting aromatic polycarbonate had a wide distribution of molecular weight.

SUMMARY OF THE INVENTION

An object of the present invention is to provide a process for producing continuously an aromatic polycarbonate having, inter alia, a well-regulated molecular weight distribution, a high rate of end capping and a low nitrogen content.

Another object of the present invention is to provide a process for producing continuously an aromatic polycarbonate where hydrolysis of a carbonyl halide compound is suppressed.

According to a first aspect of the present invention, there is provided a process for producing continuously an aromatic polycarbonate oligomer by reacting an aromatic dihydroxy compound and an alkali metal base or an alkaline earth metal base with a carbonyl halide compound which comprises:

(1) feeding continuously to a tank reactor an aromatic dihydroxy compound, water, a molecular weight controlling agent, a polymerization catalyst, a carbonyl halide compound, and an organic solvent, and an alkali metal base or an alkaline earth metal base in an amount of 1.15-1.6 equivalents based on the aromatic dihydroxy compound, (2) carrying out the reaction with a residence time as defined by the following formula, $$\log Y < -2.19X + 1.84 \quad (0.0005 \leq X < 0.84, 1 \leq Y < 69)$$

where X is an amount of the polymerization catalyst in terms of mole % based on the amount of mole of the aromatic dihydroxy compound fed per unit time, and Y is a residence time (min.), and (3) continuously withdrawing the reaction mixture from the tank reactor to obtain an aromatic polycarbonate oligomer having a number average molecular weight of 1,000-10,000

According to a second aspect of the present invention, there is provided a process for producing continuously an aromatic polycarbonate by reacting an aromatic dihydroxy compound and an alkali metal base or an alkaline earth metal base with a carboxyl halide compound which comprises:

(1) feeding continuously to a tank reactor an aromatic dihydroxy compound, water, a molecular weight controlling agent, a polymerization catalyst, a carbonyl halide compound, an organic solvent, and an alkali metal base or an alkaline earth metal base in an amount of 1.15-1.6 equivalents based on the aromatic dihydroxy compound, (2) carrying out the reaction with a residence time defined by the following formula, $$\log Y < -2.19X + 1.84 \quad (0.005 \leq X < 0.84, 1 \leq Y < 69)$$

where X is an amount of the polymerization catalyst in terms of mole % based on the amount of mole of the aromatic dihydroxy compound fed per unit time, and Y is a residence time (min.) to produce a reaction mixture containing an aromatic polycarbonate oligomer having a number average molecular weight of 1,000-10,000, and (3) feeding continuously the resulting reaction mixture or at least one tank reactor to carry out a polycondensation reaction and withdrawing continuously a reaction mixture containing an aromatic polycarbonate from the last tank reactor, (4) recovering the resulting aromatic polycarbonate from the reaction mixture.

DESCRIPTION OF THE PREFERRED EMBODIMENTS

According to the present invention, for the purpose of producing continuously an aromatic polycarbonate oligomer and/or an aromatic polycarbonate, a haloformation reaction is carried out in the presence of a polymerization catalyst and a molecular weight controlling agent, and an alkali metal base or an alkaline earth metal base is used in an amount of 1.15-1.6 equivalents based on the aromatic dihydroxy compound in the haloformation reaction. Further, the residence time in a tank reactor for effecting the haloformation reaction and the amount of the polymerization catalyst are in a particular numerical range.

In the present invention, the "haloformation reaction" is a reaction wherein an aromatic dihydroxy compound is reacted with a carbonyl halide compound to produce an aromatic polycarbonate oligomer. The "polycondensation reaction" is a reaction wherein a high molecular weight aromatic polycarbonate is produced from an aromatic polycarbonate oligomer.

The aromatic polycarbonate oligomer has a number average molecular weight of 1000-10,000, and a weight average molecular weight of 2000-40,000, and reactive end groups.

The aromatic polycarbonate has preferably a number average molecular weight of 10000 or more, a weight average molecular weight of 20000 or more, and has substantially no reactive end groups. The reactive end group as above is a group selected from a haloformate end group and a hydroxy end group.

According to the present invention, there are used aromatic dihydroxy compounds, water, molecular weight controlling agents, polymerization catalyst, carbonyl halide compounds, organic solvents and alkali metal bases or alkaline earth metal bases.

The aromatic dihydroxy compounds used in the present invention may be the following compounds of the formula (1) or (2), HO—AR$_1$—B—Ar$_2$—OH    (1)

HO—AR$_3$—OH    (2)

where Ar$_1$, Ar$_2$ and Ar$_3$ are independently selected from divalent aromatic groups, and are preferably phenylene group or substituted phenylene group.

Substituents of the substituted phenylene groups may be halogen atom, nitro group, alkyl group, cycloalkyl group, alkenyl group, aralkyl group, aryl group, alkoxy group and the like.

It is preferable that both Ar$_1$ and Ar$_2$ are substituted or unsubstituted p-phenylene group, m-phenylene group, or o-phenylene group, or one of Ar$_1$ and At$_2$ is p-phenylene group and the other is m-phenylene or o-phenylene group. It is more preferably that both Ar$_1$ and Ar$_2$ are p-phenylene group.

Ar$_3$ may be p-phenylene group, m-phenylene group or o-phenylene group, and preferably, p-phenylene group or m-phenylene group.

B is a bonding group connecting Ar$_1$ and Ar$_2$, and may be a direct bond, a divalent hydrocarbon group, or a group containing an atom or atoms other than carbon and hydrogen such as —O—, —S—, —SO—, —SO$_2$—, —CO— and the like.

The divalent hydrocarbon group is, for example, an alkylidene group such as methylene group, ethylene group, 2,2-propylidene group, cyclohexylidene group and the like, an alkylidene group having a substituent group or groups such as aryl group and the like, and a hydrocarbon group containing an aromatic group or groups or the other unsaturated hydrocarbon group(s).

Exemplary suitable aromatic dihydroxy compounds include:
bis(hydroxyaryl) alkanes such as
  bis(4-hydroxyphenyl) methane,
  1,1-bis(4'-hydroxyphenyl) ethane,
  1,2-bis(4'-hydroxyphenyl) ethane,
  bis(4-hydroxyphenyl) phenylmethane,
  bis(4-hydroxyphenyl) diphenylmethane,
  bis(4-hydroxyphenyl)-1-naphthylmethane,
  1,1-bis(4'-hydroxyphenyl)-1-phenylethane,
  2,2-bis(4'-hydroxyphenyl) propane ["bisphenol A"],
  2-(4'-hydroxyphenyl)-2-(3'-hydroxyphenyl) propane,
  2,2-bis(4'-hydroxyphenyl) butane,
  1,1-bis(4'-hydroxyphenyl) butane,
  1,1-bis(4'-hydroxyphenyl)-2-methylpropane,
  2,2,-bis(4'-hydroxyphenyl)-3-methylbutane
  2,2-bis(4'-hydroxyphenyl) pentane,
  3,3-bis(4'-hydroxyphenyl) pentane,
  2,2-bis(4'-hydroxyphenyl) heptane,
  2,2-bis(4'-hydroxyphenyl) octane,
  2,2-bis(3-methyl-4'-hydroxyphenyl) propane,
  2,2-bis(3'-ethyl-4'-hydroxyphenyl) propane,
  2,2-bis(3'-n-propyl-4'-hydroxyphenyl) propane,
  2,2-bis(3'-isopropyl-4'-hydroxyphenyl) propane,
  2,2-bis(3'-sec-butyl-4'-hydroxyphenyl) propane,
  2,2-bis(3'-tert-butyl-4'-hydroxyphenyl) propane,
  2,2-bis(3'-cyclohexyl-4'-hydroxyphenyl) propane,
  2,2-bis(3'-allyl-4'-hydroxyphenyl) propane,
  2,2-bis(3'-methoxy-4'-hydroxyphenyl) propane,
  2,2-bis(3',5'-dimethyl-4'-hydroxyphenyl) propane,
  2,2-bis(2',3',5',6'-tetramethyl-4'-hydroxyphenyl) propane,
  2,2-bis(3'-chloro-4'-hydroxyphenyl) propane,
  2,2-bis(3',5'-dichloro-4'-hydroxyphenyl) propane,
  2,2-bis(3'-bromo-4'-hydroxyphenyl) propane,
  2,2-bis(3',5'-dibromo-4'-hydroxyphenyl) propane,
  2,2-bis(2',6'-dibromo-3',5'-dimethyl-4'-hydroxyphenyl) propane,
  bis(4-hydroxyphenyl) cyanomethane,
  1-cyano-3,3-bis(4'-hydroxyphenyl) butane,
  2,2-bis(4'-hydroxyphenyl) hexafluoropropane and the like;
bis(hydroxyaryl) cycloalkanes such as
  1,1-bis(4'-hydroxyphenyl) cyclopentane,
  1,1-bis(4'-hydroxyphenyl) cyclohexane,
  1,1-bis(4'-hydroxyphenyl) cycloheptane,
  1,1-bis(4'-hydroxyphenyl) cyclooctane,
  1,1-bis(4'-hydroxyphenyl) cyclononane,
  1,1-bis(4'-hydroxyphenyl) cyclododecane,
  1,1-bis(3'-methyl-4'-hydroxyphenyl) cyclohexane,
  1,1-bis(3',5'-dimethyl-4'-hydroxyphenyl) cyclohexane,
  1,1-bis(3',5'-dichloro-4'-hydroxyphenyl) cyclohexane,
  1,1-bis(4'-hydroxyphenyl)-4-methylcyclohexane,
  1,1-bis(4'-hydroxyphenyl)3,3,5-trimethylcyclohexane,
  2,2-bis(4'-hydroxyphenyl) norbornane,
  8,8-bis(4'-hydroxyphenyl) tricyclo[5.2.1.0$^{2,6}$] decane,
  2,2-bis(4'-hydroxyphenyl) adamantane and the like;
bis(hydroxyaryl) ethers such as
  4,4'-dihydroxydiphenyl ether,
  3,3'-dimethyl-4,4'-dihydroxydiphenyl ether,
  ethylene glycol bis(4'-hydroxyphenyl) ether and the like;
bis(hydroxyaryl) sulfides such as
  4,4'-dihydroxydiphenyl sulfide,
  3,3'-dimethyl-4,4'-dihydroxydiphenyl sulfide,
  3,3'- dicyclohexyl-4,4'-dihydroxydiphenyl sulfide,
  3,3'-diphenyl-4,4'-dihydroxydiphenyl sulfide,
  3,3',5,5'-tetramethyl-4,4'-dihydroxydiphenyl sulfide, and the like;
bis(hydroxyaryl) sulfoxides such as
  4,4'-dihydroxydiphenyl sulfoxide,
  4,4'-dihydroxy-3,3'-dimethyldiphenyl sulfoxide and the like;
bis(hydroxyaryl) sulfones such as
  4,4'-dihydroxydiphenyl sulfone,
  4,4'-dihydroxy-3,3'-dimethyldiphenyl sulfone and the like;
bis(hydroxyaryl) ketones such as
  bis(4-hydroxyphenyl) ketone,
  bis(3-methyl-4-hydroxyphenyl) ketone and the like;
and further
  6,6'-dihydroxy-3,3,3',3'-tetramethylspiro(bis)indan ["spirobiindan bisphenol"],
  7,7'-dihydroxy-3,3',4,4'-tetrahydro-4,4,4',4'-tetramethyl-2,2'-spirobi(2H-1-benzopyran),
  trans-2,3-bis(4'-hydroxyphenyl)-2-butene, 9,9-bis(4'-hydroxyphenyl) fluorene, 3,3-bis(4'-hydroxyphenyl)-2-butanone,
1,6-bis(4'-hydroxyphenyl)-1,6-hexanedione,
1,1-dichloro-2,2-bis(4'-hydroxyphenyl) ethylene,
1,1-dibromo-2,2-bis(4'-hydroxyphenyl) ethylene,
1,1-dichloro-2,2-bis(5'-phenoxy-4'-hydroxyphenyl) ethylene,
α,α,α',α'-tetramethyl-α,α'-bis(4-hydroxyphenyl)-p-xylene,
α,α,α',α'-tetramethyl-α,α'-bis(4-hydroxyphenyl)-m-xylene,
3,3-bis(4'-hydroxyphenyl) phthalide,
1,5-dihydroxynaphthalene,
2,6-dihydroxynaphthalene,
2,7-dihydroxynaphthalene,
4,4'-dihydroxybiphenyl,
hydroquinone,
resorcin and the like.

In addition, for example, an aromatic dihydroxy compound having an ester bond is useful which can be produced by reacting 2 moles of bisphenol A with one mole of isophthaloyl chloride or terephthaloyl chloride.

These aromatic dihydroxy compounds may be used alone or in combination.

In the process of the present invention, bisphenol A is preferable in view of the easy availability and good physical properties of the resulting aromatic polycarbonate.

Water used in the process of the present invention may be distilled water, deionized water and the like. Waste water formed in the production of the aromatic polycarbonate oligomer and/or aromatic polycarbonate can be used directly or by mixing with distilled water, deionized water or the like.

When such waste water is used, the amount of inorganic salts in the water to be used is preferably less than about 20% by weight based on the amount of an aromatic dihydroxy compound fed per unit time.

When such preferable waste water is used, various physical properties such as rate of end capping, molecular weight distribution, transparency, resistance to heat decomposition and the like of the resulting aromatic polycarbonate are not different from those produced by using pure water such as distilled water, deionized water and the like. Further the degree of hydrolysis of the carbonyl halide compound during the production reaction is not different from that when the pure water is used. In summary, the results are satisfactory.

On the contrary, when a water containing about 20% by weight or more of inorganic salts is used, the solubility of the aromatic dihydroxy compound decreases, and therefore, it is necessary to use a large amount of water or carry out the reaction in a slurry state. As a result, sometimes an aromatic polycarbonate having a wide molecular weight distribution is produced.

In the present invention, an aromatic polycarbonate having a wide molecular weight distribution means an aromatic polycarbonate having a polydispersity index (ratio of weight average molecular weight to number average molecular weight) of about 3.0 or more, while an aromatic polycarbonate having a well-regulated molecular weight distribution is an aromatic polycarbonate having a polydispersity index of about 2.0 or more and less than 3.0.

The inorganic salts may be chlorides or carbonates of alkali metal or alkaline earth metal such as sodium chloride, sodium carbonate, sodium hydrogen carbonate, potassium chloride, potassium carbonate, potassium hydrogen carbonate, calcium chloride, calcium carbonate and the like, and mixtures thereof.

The inorganic salt is preferably sodium chloride or potassium chloride, which is produced in a large amount as a by-product.

The amount of water is preferably the amount of water which can substantially completely dissolve the aromatic dihydroxy compound, provided that the alkali metal base or alkaline earth metal base is about 1.15–1.6 equivalents based on the aromatic dihydroxy compound.

When the amount of water is much less than the above-mentioned amount, the alkali metal salt or alkaline earth metal salt of the aromatic dihydroxy compound is not sufficiently dissolved, and the resulting aromatic polycarbonate is colored sometimes since solid aromatic dihydroxy compound is scattered during the haloformation reaction or is dissolved when the temperature is elevated.

When a large excess amount of water is used, hydrolysis of the carbonyl halide compound is liable to increase and the production efficiency of the aromatic polycarbonate is lowered.

Preferably, the amount of water is about 0.8–2.2 liters per one mole of the aromatic dihydroxy compound fed per unit time, and more preferably the amount of water is about 0.9–1.7 liter.

The molecular weight controlling agent used in the present invention is an agent for controlling a molecular weight in the step of producing an aromatic polycarbonate.

As the molecular weight controlling agent, a monohydroxy aromatic compound is usually used. Further, there may be used an alkali metal salt or alkaline earth metal salt of a monohydroxy aromatic compound, a haloformate derivative of a monohydroxy aromatic compound, a monobasic carboxylic acid, an alkali metal salt or alkaline earth metal salt of a monobasic carboxylic acid, an acid halide derivative of a monobasic carboxylic acid, or the like.

Examples of monohydroxy aromatic compounds include:
phenol,
p-tert-butylphenol,
o-cresol,
m-cresol,
p-cresol,
o-ethylphenol,
p-ethylphenol,
p-cumylphenol,
p-phenylphenol,
p-cyclohexylphenol,
p-n-octylphenol,
p-nonylphenol,
p-methoxyphenol,
p-n-hexyloxyphenol,
P-isopropenylphenol,
o-chlorophenol,
m-chorophenol,
p-chlorophenol,
o-bromophenol,
m-bromophenol,
p-bromophenol,
pentabromophenol,
pentachlorophenol,
β-naphthol,
α-naphthol,
2-(4'-methoxyphenyl)-2-(4''-hydroxyphenyl) propane, and the like.

Examples of alkali metal salts or alkaline earth metal salts of monohydroxy aromatic compounds include sodium salts, potassium salts, calcium salts and the like of the above-mentioned monohydroxy aromatic compounds.

Examples of haloformate derivatives of monohydroxy aromatic compounds are haloformate derivatives of the above mentioned monohydroxy aromatic compounds.

Examples of monobasic carboxylic acids include:
aliphatic monobasic carboxylic acids such as
  acetic acid,
  propionic acid,
  butyric acid,
  valeric acid,
  caproic acid,
  heptanoic acid,
  caprylic acid,
  2,2-dimethylpropionic acid,
  3-methylbutyric acid,
  3,3-dimethylbutyric acid,
  4-methylvaleric acid,
  3,3-dimethylvaleric acid,
  4-methylcaproic acid,
  2,4-dimethylvaleric acid,
  3,5-dimethylcaproic acid,
  phenoxyacetic acid,
  and the like, and
aromatic monobasic carboxylic acids such as
  benzoic acid,
  p-methylbenzoic acid,
  p-tert-butylbenzoic acid,
  p-n-propoxybenzoic acid,
  p-n-butoxybenzoic acid,
  p-n-pentyloxybenzoic acid,
  p-n-hexyloxybenzoic acid,
  p-n-octyloxybenzoic acid,
  and the like.

Examples of alkali metal salts or alkaline earth metal salts of monobasic carboxylic acids include sodium salts, potassium salts, calcium salts and the like of the above-mentioned monobasic carboxylic acids.

Examples of acid halide derivatives of monobasic carboxylic acids include acid halide derivatives of the above-mentioned monobasic carboxylic acid.

These compounds may be used alone or in combination.

From the standpoint of easy availability, phenol, p-cumylphenol and p-tert-butylphenol are preferable.

By using these molecular weight controlling agents, partially end-capped aromatic polycarbonate oligomers can be produced.

The resulting aromatic polycarbonate oligomers can be directly subjected to a polycondensation reaction without isolation with continuous stirring. Aromatic polycarbonates having controlled molecular weights can be produced, or can be converted to aromatic polycarbonates by further adding aromatic dihydroxy compounds, molecular weight controlling agents or branching agents.

The amount of the molecular weight controlling agent is adjusted corresponding to a contemplated average molecular weight of an aromatic polycarbonate to be finally produced.

The average molecular weight of the aromatic polycarbonate produced by the process of the present invention may be adjusted by the amount of a molecular weight controlling agent. However, taking into consideration various physical properties such as shaping processability, resistance to heat decomposition, impact resistance and the like, a weight average molecular weight of about 10000–100000 is preferable and that of about 20000–80000 is more preferable.

The amount of a molecular weight controlling agent necessary for producing an aromatic polycarbonate having the above-mentioned range of weight average molecular weight is preferably about 0.5–9.6 mole % based on the mole amount of the aromatic dihydroxy compound, more preferably 1.5–8.7 mole % based thereon.

According to the present invention, the molecular weight controlling agent is continuously fed to a first tank reactor, and the molecular weight controlling agent may be fed as an aqueous solution or organic solvent solution, or as an aqueous solution together with an aromatic dihydroxy compound and an alkali metal base or an alkaline earth metal base.

From the standpoint of easy availability and excellent catalytic effect, polymerization catalysts used in the process of the present invention are preferably tertiary amines, more preferably trialkylamines, and particularly preferable are trialkylamines where the alkyl group has 1–8 carbon atoms such as
  triethylamine,
  tri-n-propylamine,
  diethyl-n-propylamine,
  tri-n-butylamine,
  N,N-dimethylcyclohexylamine,
  N,N-diethylcyclohexylamine,
  N-ethyl piperidine and the like.

Furthermore, the polymerization catalyst may be used together with known polymerization catalysts such as
  quaternary ammonium salts,
  tertiary phosphines,
  quaternary phosphonium salts,
  nitrogen-containing heterocyclic compounds and salts thereof,
  iminoethers and salts thereof,
  compounds having an amido group,
  and the like.

The amount of the polymerization catalyst is an amount of the polymerization catalyst fed per unit time and is represented by the mole % based on the amount of mole of the aromatic dihydroxy compound fed per unit time.

The amount of the polymerization catalyst is determined in connection with the residence time in a first tank reactor where a haloformation reaction is carried out, and it is usually 0.0005–0.84 mole % based on the amount of mole of the aromatic dihydroxy compound fed per unit time, preferably 0.0005–0.5 mole %, more preferably 0.0005–0.2 mole %, and particularly preferable is 0.008–0.2 mole %.

When the amount of the polymerization catalyst is substantially less than 0.0005 mole %, in the case of producing aromatic polycarbonate oligomer and/or aromatic polycarbonate, hydrolysis of carbonyl halide compounds and/or haloformation compounds is not effectively suppressed. Further the aromatic polycarbonate is not efficiently produced and therefore, a long reaction time is necessary which results in the use of a series of tank reactors for producing an aromatic polycarbonate that is of a large scale and has many tank reactors.

When the amount of the polymerization catalyst is much larger than 0.84 mole % based on the amount of mole of the aromatic dihydroxy compound per unit time, there is often produced an aromatic polycarbonate having a large polydispersity index and physical properties of the resulting aromatic polycarbonate such as heat resistance, impact strength and the like are liable to be lowered.

Further, when an excessively large amount of a polymerization catalyst is used, the nitrogen content of the aromatic polycarbonate often increases due to the decomposition reaction of the polymerization catalyst.

The polymerization catalyst can be contained in an organic solvent, or waste water recovered when producing the aromatic polycarbonate oligomer and/or aromatic polycarbonate. The polymerization catalyst may be a new catalyst, a recovered catalyst or a recovered catalyst mixed with a new catalyst.

In the present invention, the polymerization catalyst is continuously fed to a first tank reactor. As a manner of feeding the polymerization catalyst, it may be fed in the form of an aqueous solution or organic solvent solution, in the form of an aqueous solution containing an aromatic dihydroxy compound, and an alkali metal base or an alkaline earth metal base, or in the form of an aqueous solution or organic solvent solution containing a molecular weight controlling agent.

The carbonyl halide compound used in the process of the present invention is a compound capable of forming a haloformate group and a carbonate bond by the reaction with a hydroxy group of an aromatic dihydroxy compound.

Examples of the carbonyl halide compounds include phosgene (carbonyl chloride), carbonyl bromide, carbonyl iodide, carbonyl fluoride and the like. These may be used in combination.

It is possible to use a dimer of phosgene, i.e. trichloromethylchloroformate, a trimer of phosgene, i.e. bis (trichloromethyl) carbonate, and the like. Typically, phosgene is preferable.

The amount of the carbonyl halide compound used in the present invention preferably should be in the range of about 1.0 –2.0 times mole based on the amount of mole of the fed aromatic dihydroxy compound per unit time, and in particular, when an aromatic polycarbonate is prepared, the amount of the carbonyl halide compound is preferably from about 1.0–1.3 times mole.

When the amount of the carbonyl halide compound is substantially smaller than 1.0 times based on the amount of mole of the fed aromatic dihydroxy compound per unit time, unreacted aromatic dihydroxy compound is liable to remain.

According to the present invention, it is possible to produce an aromatic polycarbonate oligomer and/or an aromatic polycarbonate by using a lower amount of a carbonyl halide compound. Therefore, when the amount of the carbonyl halide compound is substantially larger than 2.0 times mole based on the amount of mole of the fed aromatic dihydroxy compound per unit time, a carbonyl halide compound not participating in the reaction is liable to be hydrolyzed.

On the other hand, in the case of producing an aromatic polycarbonate, when the amount of the carbonyl halide compound is substantially larger than 1.3 times mole based on the amount of mole of the fed aromatic dihydroxy compound per unit time, there is formed a large amount of oligomers having haloformate end groups.

As the result, if further amount of an aromatic dihydroxy compound is not newly added, the amount of the haloformate end group becomes excess in the ratio of the haloformate end group to the hydroxy end group of the aromatic polycarbonate oligomer in the reaction system.

Therefore, when the polycondensation reaction time(the residence time in a series of tank reactors where the polycondensation is carried out) is an ordinary length, there is liable to be formed an aromatic polycarbonate having a haloformate end group and having a small molecular weight.

The carbonyl halide compound may be fed in any form of gas, liquid and a solution.

When the carbonyl halide compound is phosgene, it is preferably fed in the form of gas, but phosgene may be fed also in the form of an organic solvent solution, for example, a solution of phosgene dissolved in an organic solvent such as dichloromethane and the like.

Further, when a carbonyl halide compound is fed in the form of an organic solvent solution, the carbonyl halide compound may be fed by mixing the carbonyl halide compound with the organic solvent by means of a tank reactor according to a continuous or batchwise operation to prepare an organic solvent solution and feeding the resulting organic solvent solution continuously to a tank reactor; or by using a piping or gas absorption apparatus to bring a carbonyl halide compound into contact with an organic solvent while feeding both continuously so as to prepare an organic solvent solution of a carbonyl halide compound and feeding continuously said organic solvent solution to a tank reactor.

As the organic solvent used in the present invention, there may be used optionally any organic solvent which is substantially insoluble in water, inert to a haloformation reaction and a polycondensation reaction for producing an aromatic polycarbonate oligomer and/or an aromatic polycarbonate, and capable of dissolving an aromatic polycarbonate oligomer and/or an aromatic polycarbonate.

Exemplary suitable organic solvents include:
aliphatic chlorinated hydrocarbons such as
dichloromethane,
chloroform,
1,2-dichloroethane,
1,2-dichloroethylene,
trichloroethane,
tetrachloroethane,
dichloropropane,
and the like,
aromatic chlorinated hydrocarbons such as
chlorobenzene,
dichlorobenzene,
and the like,
and mixtures thereof.

Furthermore, there may be used an organic solvent composed of a mixture of the chlorinated hydrocarbon or mixture thereof and an aromatic hydrocarbon such as toluene, xylene, ethylbenzene and the like, an aliphatic hydrocarbon such as hexane, heptane, cyclohexane and the like, or other solvent.

Preferable organic solvents are aliphatic chlorinated hydrocarbons which do not have an excessively high boiling point, have a large heat of vaporization and can remove the heat of reaction by vaporization of said organic solvent. A particularly suitable organic solvent is dichloromethane which can dissolve an aromatic polycarbonate very well, has a low boiling point, and can be relatively easily removed from an aromatic polycarbonate.

Further, an organic solvent recovered from the process of the present invention for producing an aromatic polycarbonate oligomer and/or an aromatic polycarbonate can be used directly or by mixing with a new organic solvent as an organic solvent.

A preferable amount of an organic solvent is usually such that the concentration of an aromatic polycarbonate in the organic solvent upon completion of the polycondensation reaction becomes about 5–35 % by weight, more preferably about 10–20 % by weight.

When the concentration of the aromatic polycarbonate in the organic solvent solution is extremely low, a large amount of an organic solvent is necessary so that the production efficiency is lowered.

Further, when the concentration of the aromatic polycarbonate in an organic solvent is near the saturation, the viscosity of the organic solvent solution of the aromatic Polycarbonate becomes so high that the efficiency of the interfacial polymerization reaction is lowered and handling property after the polymerization is deteriorated.

It is preferable for producing efficiently an aromatic polycarbonate that a small amount of an organic solvent is used at the beginning of the haloformation reaction and an organic solvent is added at an optional time during the haloformation reaction or the polycondensation reaction, or, further, an organic solvent is added to lower the viscosity of the organic solvent solution after the molecular weight of the aromatic polycarbonate oligomer has increased and the viscosity of the organic solvent solution has increased.

For producing an aromatic polycarbonate, as the volume ratio of the organic solvent phase to the aqueous phase (water used in the reaction procedure), the volume of the organic solvent phase is preferably from about 0.6–1.2 times by volume based on the volume of the aqueous phase.

Examples of an alkali metal base or alkaline earth metal base used in the process of the present invention (hereinafter referred to as "base") include hydroxides of alkali metal or alkaline earth metal such as sodium hydroxide, potassium hydroxide, calcium hydroxide and the like. Easily available sodium hydroxide and potassium hydroxide are preferable, and sodium hydroxide is particularly preferable.

The amount of the base to be used is preferably a stoichiometric amount in connection with the amount of the carbonyl halide compound used.

When the base is used in an amount excessively less than the stoichiometric amount, the haloformation of an aromatic dihydroxy compound does not proceed well and a hydrolyzing reaction of the carbonyl halide compound is liable to occur.

When the base is used in an amount substantially more than the stoichiometric amount, the excess amount of the base is liable to cause a hydrolyzing reaction of the carbonyl halide compound and/or a haloformate compound, and furthermore, the carbonate bond of the resulting aromatic polycarbonate oligomer and/or the aromatic polycarbonate is liable to be cleaved.

The base in the stoichiometric amount necessary for producing an aromatic polycarbonate can be calculated from the amount of the base consumed in the reaction of a carbonyl halide compound with an aromatic dihydroxy compound and the amount of the base consumed in the hydrolyzing reaction of excess amount of the carbonyl halide compound or excess amount of the haloformate compound formed by the reaction.

For example, when the amount of the carbonyl halide compound is 1.0 times mole based on the amount of mole of the fed aromatic dihydroxy compound per unit time, the base in an amount of about 1.0 equivalent based on the aromatic dihydroxy compound is necessary, and when the amount of the carbonyl halide compound is 1.3 times mole, the base in amount of about 1.4–1.6 equivalents based on the aromatic dihydroxy compound is necessary.

Typically it is difficult to suppress completely the hydrolysis reaction of the carbonyl halide compound so that the amount of the carbonyl halide compound is made larger than 1.0 times mole based on the fed aromatic dihydroxy compound per unit time, and the amount of the base is larger than 1.0 equivalent.

Further, the amount of the base fed to a tank reactor used for a haloformation reaction is 1.15–1.6 equivalents based on the aromatic dihydroxy compound, preferably, 1.2–1.5 equivalents based thereon.

When the amount of the base is substantially smaller than 1.15 equivalents, the OH concentration in the aqueous phase upon producing an aromatic polycarbonate becomes so low that the decomposition reaction of the polymerization catalyst is liable to occur and the nitrogen content in the resulting aromatic polycarbonate oligomer and/or aromatic polycarbonate increases.

on the contrary, it is not preferable to use the base in an amount substantially larger than the stoichiometric amount.

When the amount of the base fed to a tank reactor to be used for conducting a haloformation reaction is less than the stoichiometric amount, the base may be further added to the reaction mixture accordingly during the haloformation reaction, or after completion of the haloformation reaction to produce the aromatic polycarbonate.

In the production of aromatic polycarbonate oligomer and/or aromatic polycarbonate, the concentration of a base in an aqueous phase may be represented by an OH concentration in the aqueous phase.

When the base is used in an amount of 1.15–1.6 equivalents based on the aromatic dihydroxy compound, the OH concentration in the aqueous phase is about 0.23–2.5 % by weight in connection with the amount of water which was described above.

When the base is used in an amount of 1.2–1.5 equivalents based on the aromatic dihydroxy compound, the OH concentration is about 0.31–2.0% by weight.

According to the present invention, if desired, branching agent may be used for producing a branched aromatic polycarbonate.

The branching agent may be a compound having at least three members, similar or dissimilar, selected from the group consisting of aromatic hydroxy group, haloformate group, carboxyl group, carbonyl halide group and active halogen atom.

Examples of the branching agents include:
phloroglucinol,
4,6-dimethyl-2,4,6-tris(4'-hydroxyphenyl)-2-heptane,
4,6-dimethyl-2,4,6-tris(4'-hydroxyphenyl) heptane,
1,3,5-tris(4'-hydroxyphenyl) benzene,
1,1,1-tris(4'-hydroxyphenyl) ethane,
1,3,5-tris(4'-hydroxyphenylisopropyl) benzene,
α,α,α'-tris(4'-hydroxyphenyl)-1-ethyl-4-isopropylbenzene, tris(4'-hydroxyphenyl) phenylmethane,
2,2-bis[4',4'-bis(4''-hydroxyphenyl)cyclohexyl]propane,
2,4-bis(hydroxyphenylisopropyl)phenol,
2,6-bis(2-hydroxy-5'-methylbenzyl)-4-methylphenol,
2-(4'-hydroxyphenyl)-2-(2'',4''-dihydroxyphenyl) propane,
1,1,4,4-tetrakis(4'-hydroxyphenyl)cyclohexane,
1,4-bis(4',4''-dihydroxytriphenylmethyl) benzene,
trimesic acid trichloride,
cyanuric acid chloride,
3,5-dihydroxybenzoic acid,
5-hydroxyisophthalic acid,
3,5-bis(chlorocarbonyloxy) benzoic acid,
5-chlorocarbonyloxyisophthalic acid,
3,3-bis(4'-hydroxyphenyl)-2-oxo-2,3-dihydroindole,
3,3-bis(4'-hydroxy-3'-methylphenyl)-2-oxo-2,3-dihydroindole,
and the like.

The amount of a branching agent to be used may vary depending on the degree of branching of the intended branched aromatic polycarbonate. It is usually about 0.05–12.0 mole % based on the amount of mole of an aromatic dihydroxy compound.

According to the present invention, a branching agent is continuously added to a tank reactor. As a manner of feeding a branching agent, the branching agent may be added in the form of an aqueous solution or an organic solvent solution, or in the form of a basic aqueous solution together with an aromatic dihydroxy compound. A branching agent may be added to the first tank reactor or any optional tank reactor in a series of tank reactors for carrying out the polycondensation reaction.

The tank reactor used in the present invention may be of a vertical type or a horizontal type, and may be any tank capable of stirring and mixing a fluid or a pulverulent body.

The tank reactor may be provided with a stirrer for stirring the reaction mixture, and the stirrer may be composed of a stirring vane and a motor for driving the stirring vane.

As a stirring vane, there is preferably used a helical vane, paddle vane, grid vane and the like. A buffle may be present at the inner surface of a tank reactor to assist the stirring. Further, it is preferable that the outer surface of a tank reactor is provided with a jacket for controlling the temperature.

The tank reactor is provided with an outlet for discharging continuously the reaction mixture.

The outlet is typically formed on the wall of the tank reactor, and the distance between the outlet and the bottom of the tank reactor is usually such that a desired amount of the reaction mixture can be retained in the tank reactor and a sufficient residence time in the tank reactor can be given to the reaction mixture.

Furthermore, it is often preferable that the outlet is furnished with an appropriate liquid sealing means so as to avoid loss of the organic solvent.

To the tank reactor may be fed aromatic dihydroxy compounds, water, molecular weight controlling agent, polymerization catalyst, carbonyl halide compounds, organic solvents and bases by various methods, for example, as follows:
  (i) each of the components is separately fed,
  (ii) a uniform aqueous solution composed of an aromatic dihydroxy compound, water and a base is prepared, and then the resulting aqueous solution, a molecular weight controlling agent, a polymerization catalyst, a carbonyl halide compound and an organic solvent are fed to a tank reactor, and
  (iii) a uniform aqueous solution composed of an aromatic dihydroxy compound, water, a molecular weight controlling agent, a polymerization catalyst and a base is prepared and then, the resulting aqueous solution, a carbonyl halide compound and an organic solvent are continuously fed to a tank reactor.

For the purpose of feeding an aromatic dihydroxy compound stationarily and stably, the aromatic dihydroxy compound is preferably fed in the form of a basic aqueous solution.

As a feeding means, it is generally preferable to feed through piping, and the feeding position may be located optionally between the central portion of the tank reactor and the wall surface of the tank reactor.

Further, the relationship among the feeding positions for an aromatic dihydroxy compound, a molecular weight controlling agent, a polymerization catalyst, a carbonyl halide compound, an organic solvent and a base may be optionally selected.

It is preferable to feed an aromatic dihydroxy compound and a carbonyl halide compound to a position above the liquid surface or below the liquid surface of the reaction mixture so that both are brought into contact with each other in the reaction mixture.

In addition, an aromatic dihydroxy compound, water, a molecular weight controlling agent, a polymerization catalyst, a carbonyl halide compound, an organic solvent and a base may be fed to any optional positions of a first tank reactor through a plurality of inlet portions.

Examples of methods for discharging the reaction mixture in the tank reactor include,
  (1) a method for discharging using a overflow or a pump,
  (2) a method for discharging comprising withdrawing the reaction mixture from the bottom or the side portion of the tank reactor by using a pump, returning the withdrawn reaction mixture to the other portion the tank reactor through a piping and recirculating while discharging a reaction mixture in the same amount as the total amount of a base aqueous solution of an aromatic dihydroxy compound, a carbonyl halide compound, an organic solvent, a molecular weight controlling agent and a polymerization catalyst fed to the tank reactor from an optional position of the piping,
  (3) a method for discharging the reaction mixture by a quasi continuous manner, i.e. intermittently at intervals of a very short time, through an outlet provided at the bottom portion or the side portion of the tank reactor, and
  (4) a method for discharging continuously the reaction mixture from the bottom or the middle portion of the tank reactor while controlling the flow rate by a control valve or the like.

The process for the production of the present invention is usually carried out at a reaction temperature of about 10°–50° C., and when dichloromethane is used as an organic solvent, the reaction temperature is usually preferably about 10°–40° C.

At a reaction temperature substantially lower than 10° C., the reaction velocity is so slow that such temperature not practical.

When the reaction temperature is substantially higher than 50° C., the solubility of the carbonyl halide compound in the organic solvent is lowered and furthermore, hydrolysis reaction of the carbonyl halide compound and/or the haloformate compound is also accelerated.

When the reaction of the aromatic dihydroxy compound with the carbonyl halide compound is carried out at a reaction temperature substantially higher than 50° C. in the presence of the polymerization catalyst, the polymerization catalyst is decomposed and the nitrogen content in the resulting aromatic polycarbonate oligomer and/or aromatic polycarbonate increases.

When an organic solvent having a boiling point higher than about 50° C. is used, the reaction mixture should be cooled accordingly to lower the reaction temperature to about 50° C. or lower.

When an organic solvent having a boiling point of about 50° C. or lower is used, the reaction temperature can be kept at a temperature of about 50° C. or lower by producing the aromatic polycarbonate oligomer and/or aromatic polycarbonate under reflux of an organic solvent.

When the organic solvent is dichloromethane, it is possible to carry out the reaction at atmospheric pressure at a reflux temperature of about 39° C.

The reaction is usually conducted at atmospheric pressure, but, if desired, the reaction may be effected at a pressure lower or higher than atmospheric pressure.

According to the process of the present invention, the amount of the polymerization catalyst and the residence time in the first tank reactor may be in the range satisfying the relationship of the following formula, $$\log Y < -2.19X + 1.84 \quad (0.0005 \leq X < 0.84, 1 \leq Y < 69)$$

where X is the amount of the polymerization catalyst (mole % based on the amount of mole of the aromatic dihydroxy compound fed per unit time), Y is the residence time (min).

In the present invention, a residence time is an average residence time of a reaction mixture in a tank reactor.

The residence time can be calculated by using the inner volume of the tank reactor and the total volume of an aromatic dihydroxy compound, water, a molecular weight controlling agent, a polymerization catalyst, a carbonyl halide compound, an organic solvent and a base fed to the tank reactor per unit time.

For example, when 0.5 liter of the total feed per minute is fed to a tank reactor of an inner volume of 5 liters, the residence time is 10 minutes.

The amount of the polymerization catalyst can be determined according to the above-mentioned formula corresponding responding to the residence time in the first tank reactor.

When the residence time of the first tank reactor is short, the range of the preferable amount of the polymerization catalyst is wide. On the contrary, when the residence time in the first tank reactor is long, the range of the preferable amount of the polymerization catalyst is narrow.

For example, if the residence time in the first tank reactor is three minutes, the preferable amount range of the polymerization catalyst is in the range of 0.005 to 0.62 mole % based on the mole amount of the aromatic dihydroxy compound fed per unit time.

On the contrary, when the residence time in the first tank reactor is 40 min, the preferable amount range of the polymerization catalyst is 0.0005 mole % or more and less than 0.11 mole % based on the mole amount of the aromatic dihydroxy compound fed per unit time.

When there is selected a combination of an amount of the polymerization catalyst and a residence time in the first tank reactor outside of the range as determined by the above-mentioned formula, it is difficult to control the molecular weight to a desired value, and the molecular weight distribution of the resulting aromatic polycarbonate becomes wide and the physical properties such as impact resistance, heat resistance and the like are liable to be lowered.

In the first step of an embodiment of the present invention, an aromatic dihydroxy compound, water, a molecular weight controlling agent, a polymerization catalyst, a carbonyl halide compound, an organic solvent and a base in an amount of 1.15–1.6 equivalents based on the aromatic dihydroxy compound are continuously fed to a tank reactor.

Preferably, there is prepared a uniform aqueous solution composed of an aromatic dihydroxy compound, a molecular weight controlling agent, a polymerization catalyst and a base in an amount of 1.15–1.6 equivalents based on the aromatic dihydroxy compound (hereinafter referred to as "basic aqueous solution of the (an) aromatic dihydroxy compound"), and the basic aqueous solution of the aromatic dihydroxy compound, a carbonyl halide compound and an organic solvent are continuously fed to a tank reactor.

The basic aqueous solution of an aromatic dihydroxy compound is generally liable to be colored by oxidation or the like, and therefore, if desired, the basic aqueous solution of an aromatic dihydroxy compound may be prepared by adding a reducing agent such as sodium sulfite, hydrosulfite, sodium borohydride and the like as an antioxidizing agent.

The temperature at which the basic aqueous solution of an aromatic dihydroxy compound is prepared is preferably 20° C. or less, and the coloration can be prevented when the aromatic dihydroxy compound is dissolved. The preparation of the basic aqueous solution of an aromatic dihydroxy compound may be prepared batchwise at an optional time, but it is preferable to prepare it by a continuous procedure.

With respect to water used in the reaction procedure, it is preferable to recover a reaction water containing a small amount of the polymerization catalyst or a washing water used for producing the aromatic polycarbonate oligomer and/or aromatic polycarbonate, adjust the content of the inorganic salt in the water to 20% by weight or less by appropriately concentrating or diluting and then use the resulting water.

Then, the base aqueous solution of an aromatic dihydroxy compound, a carbonyl halide compound and an organic solvent are respectively added to a first tank reactor.

The amount of the respective materials to be fed is adjusted such that the amount of the respective materials fed per unit time is within the range of the above-mentioned amount to be used.

That is, it is preferable that the amount of the carbonyl halide compound should be in the range of about 1.0–2.0 times mole based on the aromatic dihydroxy compound in the basic aqueous solution of aromatic dihydroxy compound, and the volume of the organic solvent is from about 0.6–1.2 times by volume based on the volume of the water in said basic aqueous solution.

The feeding speed of the total materials is preferably such that a predetermined residence time can be attained in connection with the inner volume of the first tank reactor.

The faster the feeding speed, the shorter the residence time. On the contrary, the slower the feeding speed, the longer the residence time.

The residence time in the first tank reactor is determined depending on the amount of the polymerization catalyst, and it is 1-69 min, preferably 1-45 min, and more preferably 5-45 min.

As the residence time becomes short, the amount of heat generation in the first tank reactor increases. Therefore, when the reaction is carried out within a residence time substantially shorter than one minute, a heat generation often occurs which is difficult to control.

Further, it is not preferable from the standpoint of production efficiency that the reaction is carried out at an excessively long residence time, and further such long residence time sometimes gives an undesirable wide molecular weight distribution of the resulting aromatic polycarbonate.

The stirring during the reaction is an important factor in the interfacial reaction, and it is preferable to keep the stirring at least enough to prevent the separation of the aqueous phase and the organic solvent phase.

It is not preferable to effect an excessively strong stirring since hydrolysis of a carbonyl halide compound and/or a haloformate compound is accelerated.

An excessively insufficient stirring is not preferable since the reaction under interfacial conditions does not proceed well.

The stirring conditions are affected by the shape of the tank reactor where the reaction is carried out, the shapes of the stirring vanes and the like, and therefore, it is not possible to indicate preferable stirring conditions by the number of rotation of a stirrer, but it is possible to obtain preferable stirring conditions suitable for the reactor by a simple experiment.

It is usually preferable to carry out a haloformation reaction under stirring conditions which allow substantially uniform mixing of an organic solvent phase and water phase.

According to the present invention, it is possible to produce an aromatic polycarbonate oligomer having an optional molecular weight by selecting the amount of the polymerization catalyst and the residence time in the first tank reactor according to the formula.

Preferably, the amount of the polymerization catalyst and the residence time are adjusted so that an aromatic polycarbonate oligomer having a number average molecular weight of 1000-10000 and a weight average molecular weight of 2000-40000 can be produced.

More preferably, the amount of the polymerization catalyst and the residence time are adjusted so that an aromatic polycarbonate oligomer having a number average molecular Weight of 1500-7500 and a weight average molecular weight of 3000-30000 can be produced.

An aromatic polycarbonate oligomer having an excessively large average molecular weight is not preferable since in the production of an aromatic polycarbonate therefrom the molecular weight is often difficult to control.

When an aromatic polycarbonate oligomer is produced according to the present invention, it is an ordinary procedure to separate an organic solvent phase from a reaction mixture containing an aromatic polycarbonate oligomer continuously discharged from the first tank reactor, to neutralize the organic solvent phase with a mineral acid such as hydrochloric acid and the like, and if desired, after removing the inorganic salt by extraction or the like, to distill away the organic solvent to obtain a solid aromatic polycarbonate oligomer.

When an aromatic polycarbonate is produced from the resulting aromatic polycarbonate oligomer, it is preferable to feed continuously the resulting aromatic polycarbonate oligomer from the reaction mixture discharged from the first tank reactor to the subsequent tank reactor without isolating the resulting aromatic polycarbonate oligomer, continue the stirring, and carry out the polycondensation reaction to produce an aromatic polycarbonate.

Furthermore, in the case of other application, such as producing an aromatic polycarbonate copolymer, the aromatic polycarbonate oligomer can be also directly used for the copolymerization reaction without its isolation from the reaction mixture.

According to the present invention, there is obtained a reaction mixture composed of an organic solvent phase containing an aromatic polycarbonate oligomer having a number average molecular weight of 1000-10000 and a weight average molecular weight of 2000-40000 and an aqueous phase containing 0-about 30 mole % of unreacted aromatic dihydroxy compound based on the fed aromatic dihydroxy compound.

When an aromatic polycarbonate is continuously produced from said reaction mixture, stirring is continued in at least one tank reactor to carry out a polycondensation reaction.

Preferably, a tank reactor apparatus comprising 1-6 tank reactors for the polycondensation reaction is used and the stirring is continued at a residence time two or more times that in the first tank reactor to conduct the polycondensation reaction.

The purpose of continuous the stirring is to react completely hydroxy end groups with haloformate end groups of the aromatic polycarbonate oligomer produced by the reaction of the carbonyl halide compound with the aromatic dihydroxy compound.

In the polycondensation reaction with continuous stirring, the residence time in each tank reactor is usually from several minutes to about two hours though it varies depending on the stirring condition. In general, a residence time of from about 10 min to 60 min is sufficient. Too long of a residence time is not preferable from the standpoint of production efficiency.

The reaction mixture containing the aromatic polycarbonate produced by the present invention is then subjected to a post-treatment by a continuous or batchwise procedure, preferably a continuous procedure, to recover the aromatic polycarbonate.

The post-treatment of the reaction mixture comprises separating an aqueous phase and the organic solvent phase containing an aromatic polycarbonate, then, if desired, washing the organic solvent phase containing the aromatic polycarbonate with water or a diluted alkaline aqueous solution, and neutralization with a diluted acidic aqueous solution.

The acid used here may be a mineral acid such as hydrochloric acid, sulfuric acid, phosphoric acid and the like. After that, water washing is repeated until electrolytes substantially disappear.

Next, the organic solvent is removed from the organic solvent solution of the aromatic polycarbonate thus washed by a conventional method, and the aromatic polycarbonate is recovered.

As a method for recovering an aromatic polycarbonate by removing an organic solvent from an organic solvent solution of an aromatic polycarbonate, there may be mentioned, for example, a method for removing an organic solvent by a distillation or a steam distillation, or a method comprising adding an organic solvent incapable of dissolving an aromatic polycarbonate (anti-solvent) to an organic solvent solution of an aromatic polycarbonate to make the aromatic polycarbonate a solid state and separating an organic solvent from the organic solvent slurry of the aromatic polycarbonate by filtration and the like.

As more concrete methods, there may be mentioned the following methods:

- a method comprising distilling away a predetermined amount of an organic solvent from an organic solvent solution of an aromatic polycarbonate to make the organic solvent solution of the aromatic polycarbonate a saturated state resulting in crystallization of the aromatic polycarbonate, pulverizing the crystal and drying to remove the organic solvent contained therein;
- a method comprising heating the organic solvent solution of an aromatic polycarbonate while directly removing the organic solvent, melting the aromatic polycarbonate and directly pelletizing;
- a method comprising feeding an organic solvent solution of an aromatic polycarbonate to a warm water to remove the organic solvent and pulverizing the resulting gel-like matter;
- a method comprising feeding an anti-solvent or a non-solvent for an aromatic polycarbonate and water to an organic solvent solution of the aromatic polycarbonate, heating to concentrate the solution and obtaining the solid aromatic polycarbonate as a water slurry;
- a method comprising vaporizing and distilling away an organic solvent while feeding an organic solvent solution of an aromatic polycarbonate to a warm water containing an anti-solvent for the aromatic polycarbonate and the aromatic polycarbonate pulverulent body, and obtaining a solid aromatic polycarbonate as a water slurry;

and the like.

Examples of non-solvents for aromatic polycarbonates used here include:
aromatic hydrocarbons such as toluene, xylene and the like; and
examples of anti-solvents for aromatic polycarbonates used here include:
aliphatic hydrocarbons such as
pentane,
hexane,
octane,
cyclohexane,
methylcyclohexane,
and the like;
alcohols such as
methanol,
ethanol,
propanol,
butanol,
pentanol,
hexanol,
and the like;
ketones such as
acetone,
methyl ethyl ketone,
diethyl ketone,
methyl isobutyl ketone,
cyclohexanone,
and the like; and
esters such as
ethyl acetate,
butyl acetate,
amyl acetate,
and the like.

The aromatic polycarbonate produced according to the process of the present invention can be used as a molding material by mixing with other polymer.

As the other polymer, there may be mentioned:
polyethylene,
polypropylene,
polystyrene,
ABS resin,
poly(methyl methacrylate),
polytrifluoroethylene,
polytetrafluoroethylene,
polyacetal,
polyphenylene oxide,
poly(butylene terephtalate),
poly(ethylene terephthalate),
polyamide,
polyimide,
polyamido-imide,
polyether imide,
polysulfone,
polyether sulfone,
para-oxybenzoyl series polyester,
polyarylate,
polysulfide,
and the like.

The aromatic polycarbonate produced according to the process of the present invention may be used alone or in combination with other polymer, and there may be added to the aromatic polycarbonate various known additives such as pigment, dye, thermal stabilizer, antioxidant, ultraviolet ray absorber, releasing agent, organic halogen compound, alkali metal sulfonate, glass fibers, carbon fibers, glass beads, barium sulfate, $TiO_2$ and the like when producing or after producing the aromatic polycarbonate by conventional methods.

The aromatic polycarbonate obtained by the process of the present invention may be used alone or in combination with other polymer, and if desired, the above-mentioned additive is added, and the resulting material may be molded to produce chassis and housing material for electric machine and apparatus, electronic parts, car parts, substrates of information recording mediums such as compact disks and the like, optical materials such as lenses of cameras and spectacles, construction materials substituting for glass and the like.

The aromatic polycarbonate obtained by the process of the present invention is thermoplastic, and in a molten state the aromatic polycarbonate can be molded by injection molding, extruding molding, blow molding, and soaked in fillers. The molding may be easily made by conventional molding methods.

As mentioned above, according to the process of the present invention, there can be continuously produced an aromatic polycarbonate having at least partly a well-regulated molecular weight distrubution, a high rate of end capping and a low nitrogen content, and further, the aromatic polycarbonate can be produced while hydrolysis of a carbonyl halide compound is suppressed.

The present invention is now more particularly described with reference to the following examples which are for the purpose of illustration only and are intended to imply no limitation thereon.

Table 1 shows conditions for producing aromatic polycarbonate oligomers and/or aromatic polycarbonates, and physical data of the aromatic polycarbonates thus produced in Examples 2-13 and Comparative Examples 1-12.

Physical data in the Examples and Comparative Examples were measured by the following methods.

Measurement of Molecular Weight

Number average molecular weight (Mn), weight average molecular weight (Mw) and polydispersity index (Mw/Mn) were measured by gel permeation chromatography.

Amount of Hydrolysis of Carbonyl Halide Compound and/or Haloformate Compound

The amount was calculated based on the amount of the resulting sodium carbonate in the aqueous phase after completion of the polycondensation reaction.

Hydroxy end group

The number of phenolic hydroxy end group was determined by a bromination method, and then the mole % of the hydroxy end group base on one mole of the structure unit of the aromatic polycarbonate was calculated by the following formula.

Hydroxy end group (mole %) = $B \div 80 \times 254 \div 2 \times 100$ where B = Number of phenolic hydroxy end group determined by a bromination method (Br g/g).

Chloroformate end group

The number of chloroformate end group was determined by a silver chloride titration, and the mole % of the chloroformate end group based on one mole of the structure unit of the aromatic polycarbonate was calculated according to the following formula.

Chloroformate end group (mole %) = $C \times 254 \div 10$ where C is the number of chloroformate end group determined by a silver chloride titration (meq/g).

Rate of end capping

Calculated by the following formula, $$\text{Rate of end capping (\%)} = \frac{A}{A + B' + C'} \times 100$$

A: Amount of a molecular weight controlling agent (the mole % of the molecular weight controlling agent based on the amount of mole of the aromatic dihydroxy compound fed per unit time)

B': Ratio of amount of mole of hydroxy end group to one mole of structure unit of the aromatic polycarbonate (mole %)

C': Ratio of amount of mole of chloroformate end group to one mole of structure unit of the aromatic polycarbonate (mole %)

Nitrogen content in aromatic polycarbonate

Determined by means of an apparatus for measuring the total of micro amount of nitrogen, TN-10 type, manufactured by Mitsubishi Kasei K. K.

EXAMPLE 1

Bisphenol A 3269 g (14.34 moles), p-tert-butylphenol 7.961 g (0.4531 mole) as a molecular weight controlling agent, triethylamine 2.331 g [0.0231 mole (0.16 mole % based on bisphenol A)], sodium hydroxide 1663 g (41.57 moles), and hydrosulfite 6.532 g were dissolved in water 2.191 kg to prepare a uniform aqueous solution of the total amount of 27.206 kg.

The resulting solution, phosgene and dichloromethane were fed to a first tank reactor having an inner volume of 5 liters at feeding rates of 129.55 g/min, 7.638 g (0.07715 mole)/min, and 113.1 g/min, respectively.

This tank reactor was provided with an outlet for overflowing, and the reaction mixture was discharged at a rate of 250.29 g/min. The residence time was about 20 min.

The continuously discharged reaction mixture was immediately separated into different liquid phases and the organic phase was neutralized with hydrochloric acid.

The operation was continuously carried out for 3.5 hours, and molecular weight of the resulting aromatic polycarbonate oligomer and the amount of unreacted bisphenol A present in the aqueous phase of the reaction mixture were measured every 30 min.

With respect to the molecular weight of the aromatic polycarbonate oligomer, the number average molecular weight was 3100-3200 and the weight average molecular weight was 9800-10100, and the amount of unreacted bisphenol A in the aqueous phase was 6.5-6.6 mole % based on the amount of mole of the fed bisphenol A and the values were stable during the operation.

EXAMPLE 2

Bisphenol A 8406 g (36.87 moles), p-tert-butylphenol 74.756 g (1.165 mole) as a molecular weight controlling agent, triethylamine 5.994 g [0.05935 mole (0.16 mole % based on bisphenol A)], sodium hydroxide 4277 g (106.93 moles), and hydrosulfite 16.794 g were dissolved in water 57.06 kg to prepare a uniform aqueous solution of the total amount of 69.96 kg.

The resulting aqueous solution, phosgene, and dichloromethane were fed to a first tank reactor having an inner volume of 5 liters at feeding rates of 129.56 g/min, 7.638 g (0.07715 mole)/min, and 127.37 g/min, respectively.

This tank reactor was provided with an outlet for overflowing, and the reaction mixture was discharged at a rate of 264.57 g/min. The residence time was about 20 min.

The continuously discharged reaction mixture was continuously fed to a second tank reactor through a pipe. In the second tank reactor was effected a polycondensation reaction with a residence time of 40 min while stirring continuously.

The resulting reaction mixture was added to a subsequent third tank reactor and a polycondensation reaction was effected with a residence time of 40 min while stirring continuously. The reaction mixture discharged continuously from the third tank reactor was immediately separated into different liquid phases and neutralized with hydrochloric acid.

The dichloromethane phase thus obtained was washed with pure water until electrolytes disappeared. To the resulting solution of an aromatic polycarbonate in dichloromethane were added toluene and water. The solution was heated to 98° C. to distill away dichloromethane and toluene to obtain an aromatic polycarbonate powder.

The continuous operation was effected for 9 hours, and measurements were made every one hour to give the measured values as shown in Table 1.

With respect to the molecular weight of the aromatic polycarbonate oligomer discharged from the first tank reactor, the number average molecular weight was 3100–3200 and the weight average molecular weight was 9800–10100. The amount of unreacted bisphenol A in an aqueous phase was 6.4–6.5 mole % based on the amount of mole of the fed bisphenol A, and the values were stable.

Unreacted bisphenol A was not detected in the aqueous phase when the polycondensation reaction was completed.

Table 1 shows that the molecular weight was controlled with high reproducibility and the aromatic polycarbonate having a well-regulated molecular weight distribution could be obtained under conditions satisfying the following formula, $$\log Y < -2.19X + 1.84 \quad (0.0005 \leq X < 0.84, 1 \leq Y < 69)$$

where X is an amount of the polymerization catalyst (mole %) and Y is a residence time in the first tank reactor (min).

EXAMPLE 3

The procedure of Example 2 was repeated except that sodium hydroxide 4674 g (116.83 moles) was used in place of sodium hydroxide 4277 g (106.93 moles) to prepare a uniform aqueous solution of bisphenol A and phosgene was fed at a feeding rate of 8.111 g (0.08193 mole)/min in place of a feeding rate of 7.638 g (0.07715 mole)/min, and an aromatic polycarbonate was produced.

Measurements were made every one hour. The results are shown in Table 1. When the polycondensation reaction was completed, unreacted bisphenol A was not detected in the aqueous phase.

Table 1 shows that the molecular weight was controlled with a high reproducibility and the aromatic polycarbonate having a well-regulated molecular weight distribution could be obtained under conditions satisfying the following formula, $$\log Y < -2.19X + 1.84 \quad (0.0005 \leq X < 0.84, 1 \leq Y < 69)$$

where X is an amount of the polymerization catalyst (mole %) and Y is a residence time in the first tank reactor (min).

EXAMPLE 4

Bisphenol A 8406 g (36.87 moles), p-tert-butylphenol 174.756 g (1,165 moles) as a molecular weight controlling agent, triethylamine 5.994 g [0.05935 mole (0.16 mole % based on bisphenol A)], sodium hydroxide 4277 g (106.93 moles), and hydrosulfite 16.994 g were dissolved in 57.06 kg of water containing 1260.9 g of sodium chloride to prepare a uniform aqueous solution of a total weight of 69.96 kg.

The resulting aqueous solution, phosgene and dichloromethane were fed to a first tank reactor having an inner volume of 5 liters at feeding rates of 129.56 g/min, 7.638 g (0.07715 mole)/min, and 127.37 g/min.

This tank reactor was provided with an outlet for overflowing, through which the reaction mixture was discharged at a rate of 264.57 g/min.

The residence time was about 20 min. The continuously discharged reaction mixture was continuously fed to a second tank reactor through a pipe. In the second tank reactor was effected a polycondensation reaction with a residence time of 40 min while stirring continuously.

The resulting reaction mixture was added to a subsequent third tank reactor and a polycondensation reaction was effected with a residence time of 40 min while stirring continuously. The reaction mixture discharged continuously from the third tank reactor was immediately separated into different liquid phases and neutralized with hydrochloric acid.

The dichloromethane phase thus obtained was washed with pure water until electrolytes disappeared. To the resulting solution of an aromatic polycarbonate in dichloromethane were added toluene and water. The solution was heated to 98° C. to distill away dichloromethane and toluene to obtain an aromatic polycarbonate powder.

The continuous operation was effected for 9 hours, and measurements were made every one hour to give the measured values as shown in Table 1.

With respect to the molecular weight of the aromatic polycarbonate oligomer in the reaction mixture discharged from the first tank reactor, the number average molecular weight was 3200–3300 and the weight average molecular weight was 9800–9900.

The amount of unreacted bisphenol A in the aqueous phase was 6.2–6.3 mole % based on the amount of mole of the fed bisphenol A. Upon completion of the polycondensation reaction, unreacted bisphenol A was not detected in the aqueous phase.

Table 1 shows that when a water containing an inorganic salt in an amount of less than 20% by weight based on the aromatic dihydroxy compound was used, the molecular weight was controlled with a high reproducibility and the aromatic polycarbonate having a well-regulated molecular weight distribution could be obtained when the procedure was carried out under conditions satisfying the following formula, $$\log Y < -2.19X + 1.84 \quad (0.0005 \leq X < 0.84, 1 \leq Y < 69)$$

where X is an amount of the polymerization catalyst (mole %) and Y is a residence time in the first tank reactor (min).

EXAMPLES 5–13

The procedure of Example 2 was repeated except that the amount of the polymerization catalyst (mole %) (X) and the residence time in the first tank reactor (min) (Y) were changed.

As is clear from Table 1, in each case the molecular weight was controlled with a high reproducibility and an aromatic polycarbonate having a well-regulated molecular weight distribution could be obtained under conditions satisfying the following formula, $$\log Y < -2.19X + 1.84 \quad (0.0005 \leq X < 0.84, 1 \leq Y < 69)$$

where X and Y are as defined above.

Comparative Example 1

Bisphenol A 2802 g (12.29 moles), p-tert-butylphenol 63.414 g (0.4228 mole) as a molecular weight controlling agent, triethylamine 1.998 g [0.01978 mole (0.16 mole % based on bisphenol A)], sodium hydroxide 1425 g (35.63 moles), and hydrosulfite 5.598 g were dissolved in 19.02 kg of water to prepare a uniform aqueous solution of a total weight of 23.32 kg.

The resulting aqueous solution, phosgene, and dichloromethane were fed to a reaction column of 3.2 cm in inner diameter and 25 cm in length packed with glass beads of 3 mm in diameter at feeding rates of 86.36 g/min, 5.119 g (0.0517 mole)/min, and 84.92 g/min, respectively.

The reaction mixture was discharged from the bottom of the reaction column at a rate of 176.40 g/min. The reaction mixture thus continuously discharged was continuously fed to a second tank reactor by using a pipe. In the second tank reactor was effected a polycondensation reaction with a residence time of 60 min while stirring continuously.

Further, the resulting reaction mixture was fed to the third tank reactor and a polycondensation reaction was carried out with a residence time of 60 min in the third tank reactor.

The resulting reaction mixture was continuously discharged from the third tank reactor, and was immediately separated into different liquid phases followed by neutralization with hydrochloric acid.

The resulting dichloromethane phase was washed with pure water until electrolytes disappeared. To the dichloromethane solution containing an aromatic polycarbonate was added toluene and water. The solution was heated to 98° C. to distill away an aromatic polycarbonate powder. Further a continuous operation was effected for 4.5 hours and measurements were effected every one hour to obtain the measured values in Table 1.

With respect to the molecular weight of the aromatic polycarbonate oligomer, the number average molecular weight was 740–860 and the weight average molecular weight was 2500–3200. The amount of unreacted bisphenol A in the aqueous phase was 27.6–38.3 mole% based on the amount of mole of the fed bisphenol A.

When the polycondensation reaction was completed, unreacted bisphenol A was not detected in the aqueous phase.

As is clear from Table 1, when a reaction column packed with packing was used, a large amount of hydrolyzed carbonyl halide compound and/or haloformate compound was contained in the reaction mixture.

Comparative Example 2

For comparison, the procedure of Example 2 was repeated except that the polymerization catalyst was not added to a basic aqueous solution of the aromatic dihydroxy compound in advance, but was added to the second tank reactor after effecting the haloformation reaction in the first tank reactor.

That is, bisphenol A 8406 g (36.87 moles), p-tert-butylphenol 190.243 g (1.268 moles) as a molecular weight controlling agent, sodium hydroxide 4277 g (106.93 moles), and hydrosulfite 16.794 g were dissolved in 57.06 kg of water to prepare a uniform aqueous solution of the total weight of 69.96 kg.

The resulting aqueous solution, phosgene, and dichloromethane were fed to the first tank reactor having an inner volume of 5 liters at feeding rates of 129.56 g min, 7.638 g (0.07715 mole)/min, and 105.37 g/min, respectively. This tank reactor was provided with an outlet for overflowing and the resulting reaction mixture was discharged at a rate of 242.57/min. The residence time was about 20 min.

The reaction mixture continuously discharged was fed continuously to the second tank reactor through a pipe, and an organic solvent solution, that is, a solution of triethylamine 5.994 g [0.05935 mole (0.16 mole % based on bisphenol A)]in dichloromethane 11.88 kg was fed to the second tank reactor at a feeding rate of 22.01 g/min.

In the second tank reactor a polycondensation reaction was effected with a residence time of 40 min while stirring continuously, and further, the resulting reaction mixture was fed to the subsequent third tank reactor to conduct a polycondensation with a residence time of 40 min while stirring continuously.

The resulting reaction mixture discharged continuously from the third tank reactor was immediately separated into different liquid phases and neutralized with hydrochloric acid. The resulting dichloromethane phase was washed with pure water until electrolytes disappeared.

To the resulting dichloromethane solution containing an aromatic polycarbonate were added toluene and water. The solution was heated to 98° C. to distill away dichloromethane and toluene, and an aromatic polycarbonate powder was obtained. A continuous operation was effected for 9 hours and measurements were conducted every one hour to give the measured values in Table 1.

With respect to the molecular weight of an aromatic polycarbonate oligomer discharged from the first tank reactor, the number average molecular weight was 2610–2650 and the weight average molecular weight was 4700–4800. The amount of unreacted bisphenol A in the aqueous phase was 6.3–6.5 mole % based on the mole amount of the fed bisphenol A.

When the polycondensation reaction was completed, the amount of unreacted bisphenol A in the aqueous phase was 2.0–2.3 mole % based on the amount of mole of the fed bisphenol A.

As is clear from Table 1, when a polymerization catalyst was not added upon a haloformation reaction, large amounts of the carbonyl halide compound and/or haloformate compound were hydrolyzed, and therefore, the desired molecular weight was not obtained.

Comparative Example 3

The procedure of Comparative Example 2 was repeated except that sodium hydroxide 4674 g (116.83 moles) was used in place of sodium hydroxide 4277 g (106.93 moles) to prepare a uniform aqueous solution of bisphenol A and phosgene was fed at a feeding rate of 8.111 g (0.08193 mole)/min in place of 7.638 g (0.07715 mole)/min, and an aromatic polycarbonate was produced.

The results of measurements are summarized in Table 1. Since an excess amount of phosgene was used as compared with Comparative Example 2, the average molecular weight of the resulting aromatic polycarbonate reached the contemplated value.

As is clear from Table 1, the hydrolyzed amounts of the carbonyl halide compound and/or haloformate compound in Comparative Example 3 were larger than those in Example 3 where the same amount of a carbonyl halide compound (phosgene) as in Comparative Example 3 was used.

Comparative Example 4

For comparison, the procedure of Example 2 was repeated except that the molecular weight controlling agent was not added to a basic aqueous solution of the aromatic dihydroxy compound in advance, but was added to the second tank reactor after the haloformation reaction was conducted in the first tank reactor.

That is, bisphenol A 8406 g (36.87 moles), sodium hydroxide 4277 g (106.93 moles), triethylamine 5.994 g [0.05935 moles (0.16 mole based on bisphenol A)], and hydrosulfite 16.794 g were dissolved in 57.06 kg of water to prepare a uniform aqueous solution of a total weight of 69.96 kg.

The resulting aqueous solution, phosgene, and dichloromethane were fed to a first tank reactor having an inner volume of 5 liters at feeding rates of 129.56 g/min, 7.638 g (0.07715 mole)/min, and 105.37 g/min, respectively.

This tank reactor was provided with an outlet for overflowing, and the reaction mixture was discharged from the outlet at a rate of 242.57 g/min. The residence time was about 20 min. The reaction mixture discharged continuously was fed continuously to a second tank reactor through a pipe.

Further, an organic solvent solution composed of 190.243 g (1.268 moles) of p-tert-butylphenol as a molecular weight controlling agent dissolved in 11.88 kg of dichloromethane was fed to the second tank reactor at a feeding speed of 22.35 g/min.

In the second tank reactor a polycondensation reaction was carried out with a residence time of 40 min while stirring continuously.

Further, the resulting reaction mixture was fed to the subsequent third tank reactor and a polycondensation reaction was effected with a residence time of 40 min while stirring continuously.

The reaction mixture discharged continuously from the third tank reactor was immediately separated to different liquid phases, followed by neutralization with hydrochloric acid. The resulting dichloromethane phase was washed with pure water until electrolytes disappeared.

To the resulting dichloromethane solution containing an aromatic polycarbonate were added toluene and water. The solution heated to 98° C. to distill away dichloromethane and toluene to obtain an aromatic polycarbonate powder. A continuous operation was effected for 9 hours, and measurements were effected every one hour to give the measured values in Table 1.

With respect to the molecular weight of the aromatic polycarbonate oligomer in the reaction mixture discharged from the first tank reactor, the number average molecular weight was 11900–12200 and the weight average molecular weight was 68500–69400.

The amount of unreacted bisphenol A in the aqueous 10 phase was 6.4–6.8 mole % based on the mole amount of the fed bisphenol A.

The amount of unreacted bisphenol A in the aqueous phase when the polycondensation reaction is completed was 4.5–4.7 mole %.

As is clear from Table 1, when a molecular weight controlling agent was not present upon haloformation reaction, control of the molecular weight became difficult and there was obtained an aromatic polycarbonate which had a wide molecular weight distrubution and a low rate of end capping.

Comparative Example 5

For reference, the procedure of Example 2 was repeated except that sodium hydroxide 2994 g (74.85 moles) was used in place of sodium hydroxide 4277 g (106.93 moles) to prepare a basic aqueous solution of an aromatic dihydroxy compound and a 30 weight % aqueous solution of sodium hydroxide was fed to a second tank reactor at a feeding rate of 7.92 g/min.

That is, bisphenol A 8406 g (36.87 moles), p-tert-butylphenol 174.756 g (1.165 moles) as a molecular weight controlling agent, triethylamine 5.994 g [0.05935 mole (0.16 mole % based on bisphenol A)], sodium hydroxide 2994 g (74.85 moles), and hydrosulfite 16.794 g were dissolved in 57.06 kg of water to prepare a uniform aqueous solution of a total weight of 68.66 kg.

The resulting aqueous solution, phosgene, and dichloromethane were fed to a first tank reactor having an inner volume of one liter at feeding rates of 127.14 g/min, 7.638 g (0.07715 mole)/min and 127.37 g/min, respectively.

This tank reactor was provided with an outlet for overflowing, and the reaction mixture was discharged at a rate of 262.15 g/min. The residence time was about 4 min. The reaction mixture discharged continuously was fed continuously to a second tank reactor through a pipe, and further a 30 weight % aqueous solution of sodium hydroxide was fed to the second tank reactor at a feeding rate of 7.92 g/min.

In the second tank reactor, a polycondensation reaction was carried out with a residence time of 40 min while stirring continuously, and the reaction mixture discharged from the second tank reactor was further transferred to a third tank reactor to effect a polycondensation reaction with a residence time of 40 min while stirring continuously.

A reaction mixture discharged continuously from the third tank reactor was immediately separated to different liquid phases and neutralized with hydrochloric acid.

The resulting dichloromethane phase was washed with pure water until electrolytes disappeared.

To the dichloromethane solution containing an aromatic polycarbonate were added toluene and water. The solution was heated to 98° C. to distill away dichloromethane and toluene, and an aromatic polycarbonate powder was obtained. A continuous operation was effected for 9 hours and measurements were made every one hour to give the measured values in Table 1.

With respect to the molecular weight of the aromatic polycarbonate oligomer discharged from the first tank reactor, the number average molecular weight was 800–1000 and the weight average molecular weight was 4500–5200, and the amount of unreacted bisphenol A in the aqueous phase was 2.2–3.2 mole % based on the amount of the fed bisphenol A.

When the polycondensation reaction was completed, unreacted bisphenol A was not detected in the aqueous phase.

As is clear from Table 1, the amount of hydrolyzed carbonyl halide compound and the rate of end capping of the aromatic polycarbonate were almost the same as those in Example 1, but the nitrogen content in the aromatic polycarbonate increased, and in case that the haloformation reaction was effected in the presence of a polymerization catalyst the nitrogen content in the aromatic polycarbonate increased when the amount of a base was decreased in the haloformation reaction.

Comparative Example 6

For comparison, the procedure of Example 4 was repeated except that 57.90 kg of water containing 2101.5 g of sodium chloride (25% by weight based on bisphenol A) was used in place of 57.06 kg of water containing 1260.9 g of sodium chloride (15% by weight based on bisphenol A) to prepare an aqueous sodium hydroxide solution of bisphenol A, and an aromatic polycarbonate was produced.

Bisphenol A was not completely dissolved and a part of bisphenol A was in a slurry form.

Further, a second and a third tank reactors were used to effect the polycondensation reaction with a residence time of about 40 min in each tank reactor while stirring continuously. The continuous operation was conducted for 9 hours and measurements were effected every one hour to obtain the measured values in Table 1.

With respect to the molecular weight of the aromatic polycarbonate oligomer in the reaction mixture discharged from the first tank reactor, the number average molecular weight was 3200–3300 and the weight average molecular weight was 9700–11100, and further, the amount of unreacted bisphenol A in the aqueous phase was 7.6–8.0 mole % based on the mole amount of the fed bisphenol A.

When the polycondensation reaction was completed, unreacted bisphenol A was not detected in the aqueous phase.

As is clear from Table 1, when the inorganic salt was present in water used for the reaction in an amount of 20% by weight or more based on the weight of the aromatic dihydroxy compound, an aromatic polycarbonate having a wide molecular weight distribution was produced.

Comparative Examples 7–12

The procedure of Example 2 was repeated except that the amount of a polymerization catalyst [X] (mole %) based on bisphenol A and the residence time [Y] (min) in the first tank reactor were varied.

When X and Y did not satisfy the relationship of the formula, $$\log Y < -2.19X + 1.84 \ (0.0005 \leq X < 0.84, 1 \leq Y < 69),$$

the molecular weight was not controlled well, and the polydispersity index was large and an aromatic polycarbonate of a wide molecular weight distribution was produced.

In view of the foregoing, it will be noted that when an aromatic polycarbonate was prepared by using a tank reactor apparatus, feeding a polymerization catalyst and a molecular weight controlling agent to a first tank reactor, and using a base in an amount of 1.15–1.6 equivalents based on the aromatic dihydroxy compound to effect haloformation reaction under conditions that the amount of a polymerization catalyst [X] and the residence time [Y] satisfy the following relationship, $$\log Y < -2.19X + 1.84 \ (0.0005 \leq X < 0.84, 1 \leq Y < 69),$$

there can be efficiently produced an aromatic polycarbonate having a well-regulated molecular weight distribution, a high rate of end capping and a low nitrogen content.

TABLE 1

|  | Amount of phosgene $COCl_2/DH$ | Amount of catalyst a [X] | b [Y] | c | Mn d | Mw d |
|---|---|---|---|---|---|---|
| Example 2 | 1.130 | 0.16 | 20 | o | 21000 | 52000 |
| Example 3 | 1.200 | 0.16 | 20 | o | 20800 | 51800 |
| Example 4 | 1.130 | 0.16 | 20 | o | 20900 | 52200 |
| Example 5 | 1.130 | 0.16 | 10 | o | 20800 | 52000 |
| Example 6 | 1.130 | 0.16 | 30 | o | 20900 | 52000 |
| Example 7 | 1.130 | 0.02 | 20 | o | 20900 | 51800 |
| Example 8 | 1.130 | 0.04 | 30 | o | 20500 | 52500 |
| Example 9 | 1.130 | 0.04 | 40 | o | 20900 | 52900 |
| Example 10 | 1.130 | 0.08 | 6 | o | 20600 | 52200 |
| Example 11 | 1.130 | 0.08 | 20 | o | 20500 | 52800 |
| Example 12 | 1.130 | 0.32 | 10 | o | 20700 | 51000 |
| Example 13 | 1.130 | 0.48 | 6 | o | 20800 | 53000 |
| Comparative Example 1 | 1.130 | 0.16 | 0.2 | — | 17900 | 44800 |
| Comparative Example 2 | 1.130 | (0.16) | 20 | — | 16500 | 39400 |
| Comparative Example 3 | 1.200 | (1.16) | 20 | — | 20800 | 53000 |
| Comparative Example 4 | 1.130 | 0.16 | 20 | — | 22400 | 88000 |
| Comparative Example 5 | 1.130 | 0.16 | 4 | — | 18700 | 48900 |
| Comparative Example 6 | 1.130 | 0.16 | 20 | o | 17200 | 59200 |
| Comparative Example 7 | 1.130 | 0.70 | 20 | x | 15300 | 55300 |
| Comparative Example 8 | 1.130 | 0.16 | 60 | x | 17900 | 58800 |
| Comparative Example 9 | 1.130 | 0.16 | 40 | x | 17900 | 59200 |
| Comparative Example 10 | 1.130 | 0.32 | 30 | x | 15100 | 49000 |
| Comparative Example 11 | 1.130 | 0.48 | 10 | x | 15800 | 49600 |
| Comparative Example 12 | 1.130 | 0.89 | 5 | x | 16800 | 51700 |

|  | Mw/Mn d | Amount of hydrolysis e | f | g | Rate of end capping % | Nitrogen content ppm |
|---|---|---|---|---|---|---|
| Example 2 | 2.48 | 5.1 | 0.251 | 0.007 or less | 92.6 | 16 |
| Example 3 | 2.49 | 7.2 | 0.233 | 0.007 or less | 93.1 | 16 |
| Example 4 | 2.50 | 4.6 | 0.167 | 0.007 or less | 95.0 | 17 |
| Example 5 | 2.50 | 5.2 | 0.168 | 0.007 or less | 95.0 | 18 |
| Example 6 | 2.49 | 5.0 | 0.169 | 0.007 or less | 94.9 | 16 |
| Example 7 | 2.48 | 5.3 | 0.186 | 0.007 or less | 94.4 | 12 |
| Example 8 | 2.56 | 5.0 | 0.203 | 0.007 or less | 94.0 | 14 |

TABLE 1-continued

| | | | | | | |
|---|---|---|---|---|---|---|
| Example 9 | 2.53 | 5.1 | 0.201 | 0.007 or less | 94.0 | 13 |
| Example 10 | 2.53 | 5.1 | 0.118 | 0.007 or less | 96.4 | 14 |
| Example 11 | 2.58 | 5.2 | 0.167 | 0.007 or less | 95.0 | 16 |
| Example 12 | 2.46 | 5.0 | 0.165 | 0.007 or less | 95.0 | 17 |
| Example 13 | 2.55 | 5.1 | 0.201 | 0.007 or less | 94.0 | 17 |
| Comparative Example 1 | 2.50 | 11.8 | 0.745 | 0.007 or less | 80.9 | 21 |
| Comparative Example 2 | 2.38 | 15.5 | 0.924 | 0.007 or less | 77.4 | 13 |
| Comparative Example 3 | 2.55 | 16.8 | 0.874 | 0.007 or less | 78.3 | 13 |
| Comparative Example 4 | 3.93 | 7.2 | 1.288 | 0.007 or less | 71.1 | 15 |
| Comparative Example 5 | 2.61 | 5.7 | 0.201 | 0.007 or less | 94.0 | 55 |
| Comparative Example 6 | 3.44 | 5.3 | 0.500 | 0.007 or less | 86.3 | 18 |
| Comparative Example 7 | 3.61 | 6.2 | 0.457 | 0.007 or less | 87.4 | 20 |
| Comparative Example 8 | 3.28 | 5.4 | 0.420 | 0.007 or less | 88.3 | 14 |
| Comparative Example 9 | 3.80 | 6.3 | 0.430 | 0.007 or less | 88.0 | 15 |
| Comparative Example 10 | 3.25 | 6.2 | 0.425 | 0.007 or less | 88.1 | 16 |
| Comparative Example 11 | 3.13 | 5.2 | 0.542 | 0.007 or less | 85.4 | 17 |
| Comparative Example 12 | 3.08 | 5.5 | 0.437 | 0.007 or less | 87.9 | 20 |

Note on Table 1
DH: Aromatic dihydroxy compound
a: Mole % based on amount of mole of an aromatic dihydroxy compound fed per unit time
b: Residence time in the first tank reactor (min)
c: ○ — Conditions satisfying the formula, log Y < −2.19 × +1.84 (0.0005 ≦ X <0.84, 1 ≦ Y < 69)
x — Conditions not satisfying the above-mentioned formula
d: Average value
e: Mole % based on the amount of mole of a carbonyl halide compound
f: Ratio of hydroxy end group to one mole of structure unit of an aromatic polycarbonate (mole %)
g: Ratio of chloroformate end group to one mole of structure unit of an aromatic polycarbonate (mole %)

What is claimed is:

1. A process for producing continuously an aromatic polycarbonate oligomer by reacting an aromatic dihydroxy compound and an alkali metal base or an alkaline earth metal base with a carbonyl halide compound which comprises:

(1) feeding continuously to a tank reactor an aromatic dihydroxy compound, water, a molecular weight controlling agent, a polymerization catalyst, a carbonyl halide compound, and an organic solvent, and an alkali metal base or an alkaline earth metal base in an amount of 1.15–1.6 equivalents based on the aromatic dihydroxy compound, (2) carrying out the reaction with a residence time as defined by the following formula, $$\log Y < -2.19X + 1.84 \quad (0.0005 \leq X < 0.84, 1 \leq Y < 69)$$

where X is an amount of the polymerization catalyst in terms of mole % based on the amount of mole of the aromatic dihydroxy compound fed per unit time, and Y is a residence time (min.), and (3) continuously withdrawing the reaction mixture from the tank reactor to obtain an aromatic polycarbonate oligomer having a number average molecular weight of 1,000–10,000.

2. The process according to claim 1 in which (a) a uniform aqueous solution comprising the aromatic dihydroxy compound, water and the alkali metal base or the alkaline earth metal base in an amount of 1.15–1.6 equivalents based on the aromatic dihydroxy compound is prepared, and (b) the resulting aqueous solution, the molecular weight controlling agent, the polymerization catalyst, the carbonyl halide compound, and the organic solvent are continuously fed to the tank reactor.

3. The process according to claim 1 in which (a) a uniform aqueous solution comprising the aromatic dihydroxy compound, water, the molecular weight controlling agent, the polymerization catalyst and the alkali metal base or the alkaline earth metal base in an amount of 1.15–1.6 equivalents based on the aromatic dihydroxy compound is prepared, and (b) the resulting aqueous solution, the carbonyl halide compound and the organic solvent are continuously fed to the tank reactor.

4. The process according to claim 1 in which X is 0.0005–0.5 mole %.

5. The process according to claim 1 in which X is 0.005–0.2 mole %.

6. The process according to claim 1 in which (a) a uniform aqueous solution comprising the aromatic dihydroxy compound, water, the molecular weight controlling agent, the polymerization catalyst and the alkali metal base or the alkaline earth metal base in an amount of 1.15–1.6 equivalents based on the aromatic dihydroxy compound is prepared, and (b) the resulting aqueous solution, the carbonyl halide compound and the organic solvent are continuously fed to the tank reactor, and X is 0.0005–0.2 mole % and Y is 1–45 min.

7. The process according to claim 1 in which the organic solvent is dichloromethane.

8. The process according to claim 1 in which the amount of water is 0.8–2.2 liters per one mole of the aromatic dihydroxy compound fed per unit time.

9. A process for producing continuously an aromatic polycarbonate by reacting an aromatic dihydroxy compound and an alkali metal base or an alkaline earth metal base with a carbonyl halide compound which comprises:
- (1) feeding continuously to a tank reactor an aromatic dihydroxy compound, water, a molecular weight controlling agent, a polymerization catalyst, a carbonyl halide compound, an organic solvent, and an alkali metal base or an alkaline earth metal base in an amount of 1.15–1.6 equivalents based on the aromatic dihydroxy compound,
- (2) carrying out the reaction with a residence time defined by the following formula, $$\log Y < -2.19X + 1.84 \quad (0.0005 \leq X < 0.84, 1 \leq Y < 69)$$

where X is an amount of the polymerization catalyst in terms of mole % based on the amount of mole of aromatic dihydroxy compound fed per unit time, and Y is a residence time (min.) to produce a reaction mixture containing an aromatic polycarbonate oligomer having a number average molecular weight of 1,000–10,000, and
- (3) feeding continuously the resulting reaction mixture to at least one tank reactor to carry out a polycondensation reaction and withdrawing continuously a reaction mixture containing an aromatic polycarbonate from the last tank reactor, and
- (4) recovering the resulting aromatic polycarbonate from the reaction mixture.

10. The process according to claim 9 in which
(a) a uniform aqueous solution comprising the aromatic dihydroxy compound, water and the alkali metal base or the alkaline earth metal base in an amount of 1.15–1.6 equivalents based on the aromatic dihydroxy compound is prepared, and
(b) the resulting aqueous solution, the molecular weight controlling agent, the polymerization catalyst, the carbonyl halide compound, and the organic solvent are continuously fed to the tank reactor.

11. The process according to claim 9 in which
(a) a uniform aqueous solution comprising the aromatic dihydroxy compound, water, the molecular weight controlling agent, the polymerization catalyst and the alkali metal base or the alkaline earth metal base in an amount of 1.15–1.6 equivalents based on the aromatic dihydroxy compound, is prepared, and
(b) the resulting aqueous solution, the carbonyl halide compound and the organic solvent are continuously fed to the tank reactor.

12. The process according to claim 9 in which X is 0.0005–0.5 mole %.

13. The process according to claim 9 in which X is 0.005–0.2 mole %.

14. The process according to claim 9 in which
(a) a uniform aqueous solution comprising the aromatic dihydroxy compound, water, the molecular weight controlling agent, the polymerization catalyst and the alkali metal base or the alkaline earth metal base in an amount of 1.15–1.6 equivalents based on the aromatic dihydroxy compound is prepared, and
(b) the resulting aqueous solution, the carbonyl halide compound and the organic solvent are continuously fed to the tank reactor, and X is 0.0005–0.2 mole % and Y is 1–45 min.

15. The process according to claim 9 in which the organic solvent is dichloromethane.

16. The process according to claim 9 in which the amount of water is 0.8–2.2 liter, per one mole of the aromatic dihydroxy compound fed per unit time.

17. The process according to claim 9 in which the reaction mixture containing the aromatic polycarbonate oligomer is continuously fed to a tank reactor apparatus composed of one reaction vessel or 2–6 reaction vessels connected in series to effect the polycondensation reaction.

* * * * *

UNITED STATES PATENT AND TRADEMARK OFFICE
CERTIFICATE OF CORRECTION

PATENT NO. : 5,359,117
DATED : October 25, 1994
INVENTOR(S) : Totani et al.

It is certified that error appears in the above-indentified patent and that said Letters Patent is hereby corrected as shown below:

Claim 5, column 34, line 60, "0.005" should be --0.0005--.

Claim 13, column 36, line 22, "0.005" should be --0.0005--.

Signed and Sealed this

Second Day of January, 1996

Attest:

BRUCE LEHMAN

Attesting Officer    Commissioner of Patents and Trademarks